United States Patent
Noetzelmann et al.

(10) Patent No.: US 10,613,522 B2
(45) Date of Patent: Apr. 7, 2020

(54) TEMPLATES IN A MULTIDISCIPLINARY ENGINEERING SYSTEM

(71) Applicant: Siemens Aktiengesellschaft, Munich (DE)

(72) Inventors: Oswin Noetzelmann, Diamond Bar, CA (US); Marine Durel, Long Beach, CA (US); Attila Labas, Rancho Mission Viejo, CA (US); Victor Robert Hambridge, Fountain Valley, CA (US); Andrew Dylla, Anaheim Hills, CA (US)

(73) Assignee: Siemens Aktiengesellschaft, Munich (DE)

( * ) Notice: Subject to any disclaimer, the term of this patent is extended or adjusted under 35 U.S.C. 154(b) by 132 days.

(21) Appl. No.: 15/567,412

(22) PCT Filed: Apr. 21, 2015

(86) PCT No.: PCT/US2015/026742
§ 371 (c)(1),
(2) Date: Oct. 18, 2017

(87) PCT Pub. No.: WO2016/171663
PCT Pub. Date: Oct. 27, 2016

(65) Prior Publication Data
US 2018/0101164 A1    Apr. 12, 2018

(51) Int. Cl.
*G06F 15/16*   (2006.01)
*G05B 19/418*  (2006.01)
(Continued)

(52) U.S. Cl.
CPC ..... *G05B 19/4188* (2013.01); *G05B 23/0213* (2013.01); *G06F 9/465* (2013.01);
(Continued)

(58) Field of Classification Search
CPC .. G05B 19/4188; G05B 23/0213; G06F 9/465
(Continued)

(56) References Cited

U.S. PATENT DOCUMENTS 7,231,436 B1 * 6/2007 Dalfo ................... G05B 19/00
                                                            705/12
8,725,767 B1   5/2014 Wood et al.
(Continued)

FOREIGN PATENT DOCUMENTS

WO    2014127338 A1    8/2014

OTHER PUBLICATIONS

International Search Report dated Jan. 19, 2015; International Application No. PCT/US2015/026742; Filing Date: Apr. 21, 2015; 10-pages.

*Primary Examiner* — Duyen M Doan

(57) ABSTRACT

The preferred embodiments described include methods, systems, and computer readable media for linking data in a multidisciplinary engineering system. One or more multidisciplinary templates are created for a multidisciplinary engineering system. Reusable multidisciplinary templates link engineering objects and parameters between engineering disciplines. The objects and parameters in the template may be linked to one or more disciplines based on role, responsibility, department or other criteria. Changes to the template may be propagated to each discipline affected by the changes. The template may also link data entered at the engineering applications (307) and facilitate workflows and sign-off procedures between applications (307).

19 Claims, 11 Drawing Sheets

(51) Int. Cl.
*G05B 23/02* (2006.01)
*G06Q 10/06* (2012.01)
*G06Q 30/06* (2012.01)
*G06F 9/46* (2006.01)
*G06F 21/62* (2013.01)
*G06F 21/60* (2013.01)

(52) U.S. Cl.
CPC ......... *G06F 21/6218* (2013.01); *G06Q 10/06* (2013.01); *G06Q 30/0631* (2013.01); *G05B 2219/31001* (2013.01); *G06F 21/604* (2013.01); *Y02P 90/24* (2015.11)

(58) Field of Classification Search
USPC .................................................. 709/203, 226
See application file for complete search history.

(56) References Cited

U.S. PATENT DOCUMENTS

| | | | | |
|---|---|---|---|---|
| 2003/0046047 A1* | 3/2003 | Dong | ...................... | G06F 17/50 703/6 |
| 2006/0259500 A1* | 11/2006 | Hood | .................... | G05B 19/056 |
| 2011/0055088 A1* | 3/2011 | Lenord | .................... | G06F 17/50 705/300 |
| 2011/0055150 A1* | 3/2011 | Bohm | .................... | G06F 17/50 707/610 |

\* cited by examiner

TEMPLATES IN A MULTIDISCIPLINARY ENGINEERING SYSTEM

BACKGROUND

The present embodiments relate to multidisciplinary engineering systems. For example, creating templates in a multidisciplinary system is described.

A multidisciplinary engineering system is a system that integrates multiple engineering disciplines, such as design engineering, electrical engineering, mechanical engineering, automation engineering, project management and the like, and allows engineers, technicians and managers from various disciplines to work on common or connected data. For example, factory designers can work together with mechanical engineers, electrical engineers, automation engineers and managers to plan a new production line for a car door assembly. In a multidisciplinary engineering system, each discipline has its own representation of data. For example, the same device will be represented differently in each discipline, and different data regarding the device is stored depending on the discipline.

Engineering templates are used in engineering applications. Engineering templates allow users to group engineering objects together to form a template, and work from a higher data standpoint. Engineering templates are used for each of the respective disciplines. For example, in an automation design application, a mechanical engineer is able to group two sensors and a motor to create a template representing the conveyor, and an electrical engineer uses a different template for the same grouping but of different information.

Each engineering discipline works separately from a data point of view. Therefore, manual synchronization of the discipline specific data is required, which is very time consuming and error prone. For example, when an automation engineer introduces a new programmable logic controller (PLC) to automate a production line, information about the PLC is manually transported to an electrical engineering application in order for an electrical engineer to specify an appropriate electrical cabinet to house the PLC and to plan wiring to the PLC. If the PLC information is not transported, or the PLC information is distorted during transport, the missing or incorrect information can impact the quality of the work of both the automation and electrical engineers.

SUMMARY

By way of introduction, the preferred embodiments described below include methods, systems, and computer readable media for linking data in a multidisciplinary engineering system. One or more multidisciplinary templates are created for a multidisciplinary engineering system. Reusable multidisciplinary templates link engineering objects and parameters between engineering disciplines. The objects and parameters in the template may be linked to one or more disciplines based on role, responsibility, department or other criteria. Changes to the template may be propagated to each discipline affected by the changes. The template may also link data entered at the engineering applications and facilitate workflows and sign-off procedures between applications.

In a first aspect, a method is provided for linking data in a multidisciplinary engineering system. A server configures a multidisciplinary template representing a device. The multidisciplinary template includes a plurality of objects associated with the device, wherein different ones of the objects are associated with different engineering applications for different engineering disciplines with different roles related to the device. The multidisciplinary template includes a plurality of engineering discipline specific parameters for each of the objects, at least some of the parameters for the different objects being different based on the different engineering disciplines. A plurality of engineering applications running on different computers instantiate the multidisciplinary template, with the object and corresponding parameters communicated to the engineering applications operating on the respective computers. In response to instantiating the multidisciplinary template, each of the plurality of objects and the plurality of parameters are copied to each of the associated engineering applications.

In a second aspect, a multidisciplinary engineering system is provided. A server is configured to execute a template generation application to generate a multidisciplinary template representing an engineered device. The generated template includes a plurality of objects associated with the engineered device, each of the plurality of objects associated with one of a plurality of engineering disciplines. The generated template includes an engineering discipline specific parameter associated with each of the objects, at least some of the parameters for the different objects being different based on the different engineering disciplines. A first workstation in communication with the server over a network is configured to execute a first engineering application instantiating the multidisciplinary template. Instantiating the multidisciplinary template by the first workstation copies a first object from the multidisciplinary template, the first object associated with a first engineering discipline, and copies a first parameter from the from the multidisciplinary template, the first parameter associated with the first object. A second workstation in communication with the server over the network is configured to execute a second engineering application. In response to the first workstation instantiating the multidisciplinary template, the second engineering application copies a second object from the multidisciplinary template, the second object associated a second engineering discipline, and copies a second parameter from the multidisciplinary template, the second parameter associated with the second object.

In a third aspect, a computer program product is provided for linking data in a multidisciplinary template in a multidisciplinary engineering system. The computer program product includes a non-transitory computer readable storage medium having computer readable program code embodied therewith. The computer readable program code configures a multidisciplinary template representing a device. The multidisciplinary template includes a plurality of objects associated with the device, each of the plurality of objects is associated with one of a plurality of different engineering applications for different engineering disciplines with different roles related to the device. The multidisciplinary template also includes a plurality of parameters for each of the objects, at least some of the parameters for the different objects being different based on the different engineering disciplines. The computer readable program code receives a request over a network to instantiate the multidisciplinary template from a computer running one of the plurality of different engineering applications. In response to the request, the computer readable program code transmits each of the plurality of objects and each of the plurality of parameters to the associated engineering application over the network.

Any one or more of the aspects described above may be used alone or in combination. These and other aspects, features and advantages will become apparent from the following detailed description of exemplary embodiments, which are to be read in connection with the accompanying drawings. The present invention is defined by the following claims, and nothing in this section should be taken as a limitation on those claims. Further aspects and advantages of the invention are discussed below in conjunction with exemplary embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EXEMPLARY EMBODIMENTS

Figure 1:
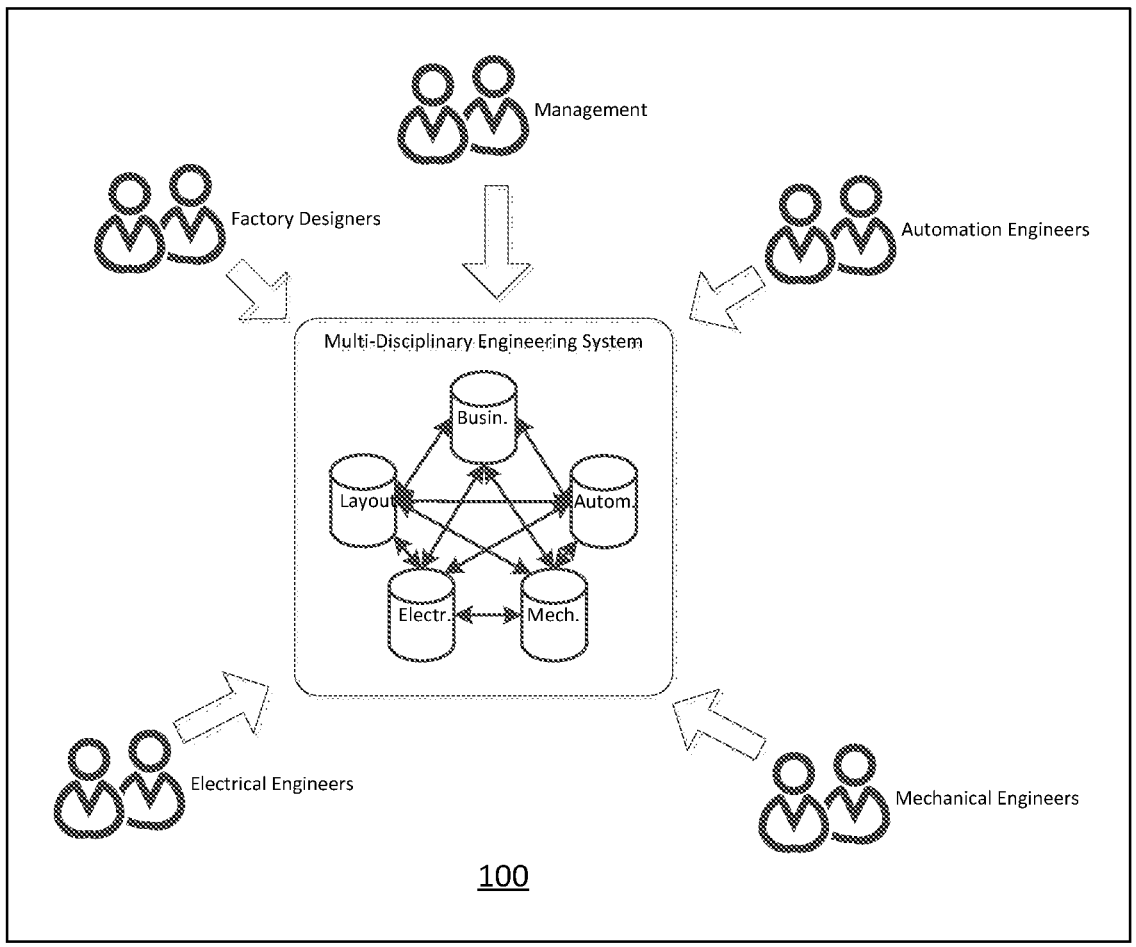
FIG. 1 illustrates an example of a multidisciplinary engineering system.

The following embodiments describe a reusable engineering solution where a multitude of engineering objects form a single template in a multi-disciplinary engineering system. The same object, differently composed depending on the engineering discipline, is represented as a single entity or device across applications. Operations are available for this template representing several objects and parameters, such as adding, deleting and duplication. The multidisciplinary template provides a scope for engineering data that can be prepared for reuse in an engineering context, such as an engineering project for an automotive plant planning.

In an engineering project, a device or other object is to be treated as a single entity in the multidisciplinary system, even if the device or object is represented differently within each discipline. For example, in an automation design application, the user is able to see that two sensors and a motor represent a conveyor device. Other roles may see the same combination of devices, but different parameters for the combination. The conveyor template and underlying information is linked to corresponding information representing the conveyor object in other engineering applications, such as in a line design application (e.g., Mechatronics Concept Designer) where the conveyor is represented by two faces and two curves and in another role where the conveyor is represented by electrical inputs and outputs. Data connections between different engineering disciplines may allow the system to support various functions absent from isolated engineering systems, including: implementation and usage of interdisciplinary templates and common data structures; notification and communication between engineering disciplines and departments; object and data change propagation, including rule based change propagation; workflows formalization, including sign-off procedures; and multidisciplinary report generation.

Data connections between different engineering disciplines may also streamline adding and deleting engineering objects between disciplines. For example, adding or deleting a conveyor to a multidisciplinary system requires knowledge that at least one motor and two sensors also need to be added or deleted. Further, data duplication may be streamlined. For example, duplicating the data corresponding to a type of conveyor may allow an automation designer to utilize previously entered data that has been stored for another conveyor of the same type. Finally, data connections between different engineering disciplines may allow for greater clarity of data. For example, a user may benefit from additional information about the device she is working on in the system, such as whether a particular sensor is part of a conveyor, rather than another device, such as a robot.

A multidisciplinary template may result in reduced engineering efforts because utilizing templates makes reusing the same groups of objects easier and reduce the effort for the engineers. A multidisciplinary template may result in shorter time to market because being able to manage (add, duplicate, delete) groups of objects with one single template will make the whole engineering process faster. A multidisciplinary template may result in reduction of errors because the fact that the data and templates are linked together representing one single entity helps keep data consistency between disciplines and reduces manual synchronization errors. A multidisciplinary template may result in integration with existing engineering applications since the template may adapt to existing and future multi-disciplinary engineering systems. All these advantages may result in investment savings and reduced risks, especially for large engineering companies that prefer to use set processes and standards.

FIG. 1 illustrates an example of a multidisciplinary engineering system. The multidisciplinary engineering system includes a server that executes the template generation application and workstations that use the template for a given engineered device or other object. The engineered device or other object is represented in the multidisciplinary system, such as the engineering device being a conveyor on a factory assembly line. The server and/or workstations in the multidisciplinary engineering system 100 include engineering applications for various engineering disciplines. The engineering applications are directed to layout design, electrical design, mechanical design, automation design, and business functions. The engineering applications correspond to engineering disciplines, such as factory design, electrical engineering, mechanical engineering, automation engineering, and project management. Each engineering application presents data differently, in a manner suited for the specific engineering discipline. Additional, different or fewer engineering applications and engineering disciplines may be provided. Alternatively, at least one of the engineering applications is directed to two or more engineering disciplines within a single application. Various engineers, designers, technicians, managers and other users access the engineering applications to complete tasks on the project.

Figure 2:
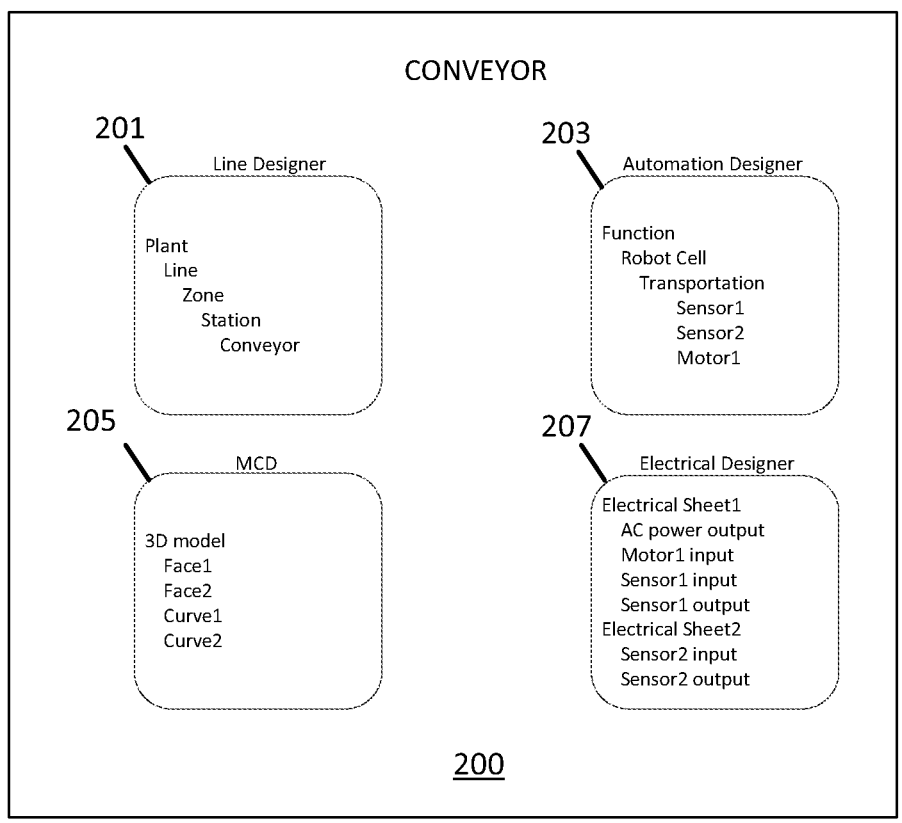
FIG. 2 illustrates an example implementation of a multidisciplinary system.

For example, in the context of an automobile factory, various engineers, designers and project managers plan a new production line for a car door assembly. The new production line includes a conveyor. Each engineering application will have its own role with respect to the conveyor, and will have its representation of data associated with the conveyor. Referring to FIG. 2, factory designers utilize the layout design application, such as line designer application 201, to plan the layout of the new production line, including the conveyor. The line designer application 201 displays information about which plan, line, zone and station where the conveyor will be placed. Automation engineers utilize the automation designer application 203 to plan the conveyor automation. Automation designer application 203 displays the function and robot cell of the conveyor, and the components of the conveyor that will be automated, including sensor1, sensor2 and motor1. Mechanical engineers utilize a mechanical design application, such as MCD 205, to plan the mechanical aspects of the conveyor. MCD 205 includes information about a three-dimensional (3D) model of the conveyor, including face1, face2, curve1 and curve2. Electrical engineers utilize the electrical designer application 207 to plan the electrical inputs and outputs for the conveyor. Electrical designer application 207 displays electrical information that will be provided to technicians installing the conveyor. Electrical sheet 1 includes an AC power output, Motor1 input, Sensor1 input and Sensor1 output. Electrical sheet 2 includes a sensor2 input and sensor2 output. Additional and different roles and/or information may be provided.

Figure 3:
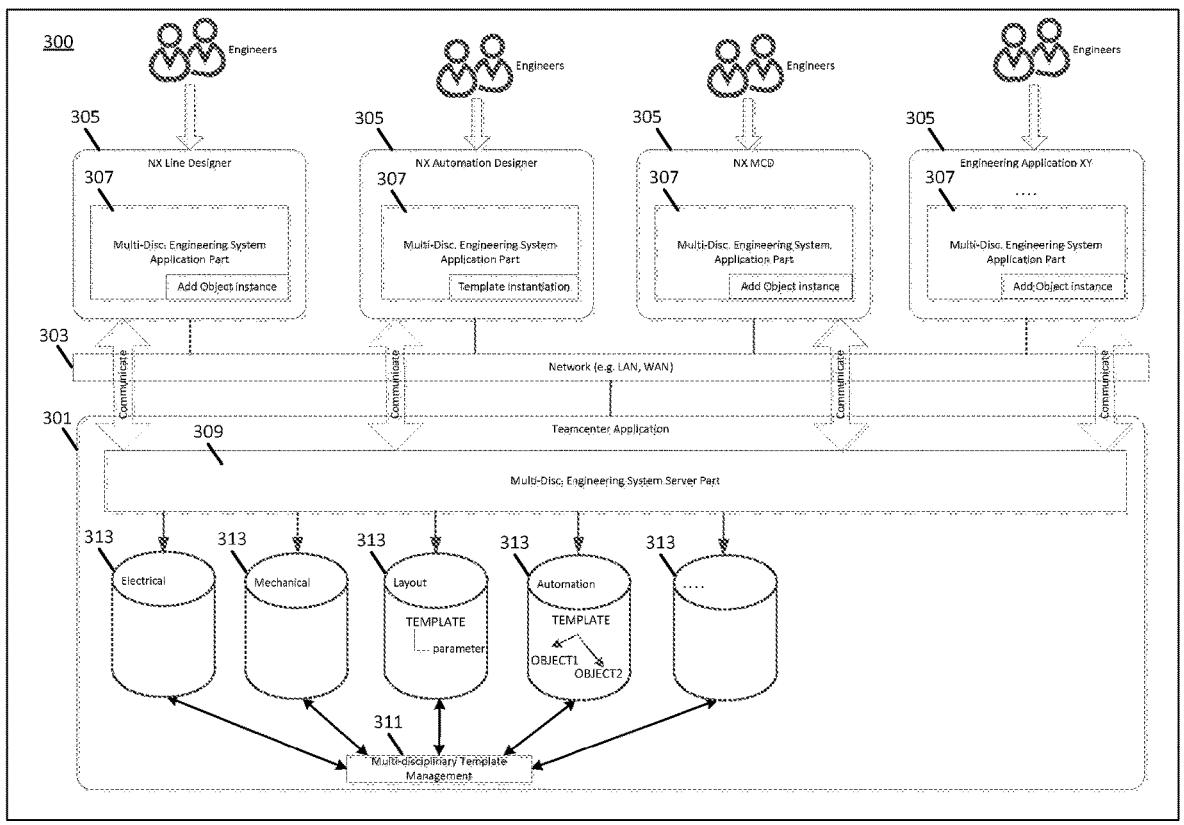
FIG. 3 illustrates one embodiment of a multidisciplinary system.

FIG. 3 illustrates an example implementation of a multidisciplinary system in an engineering environment 300. In one embodiment, the multidisciplinary system is the Siemens Engineering Environment utilizing Siemens engineering tools and applications. Additional implementations may be provided in the same or other engineering systems.

The multidisciplinary system 300 includes a server 301, a network 303 and workstations 305. Additional, different, or fewer components may be provided. For example, more or fewer workstations 305 are used. As another example, additional networks and/or servers are used. In yet another example, a separate database managed or accessed by the server 301 or the workstations 305 is provided. Alternatively, the server 301 and the workstations 305 are directly connected, or implemented on a single computing device.

Engineering Environment 300 includes workstations 305 with engineering applications 307 corresponding to various engineering disciplines and engineering roles. For example, NX Line Designer is a layout design application, such as the line designer application 201, NX Automation Designer is an automation engineering application, such as automation designer application 203, NX MCD is a three-dimensional (3D) modeling application, such as MCD 205, and NX Electrical Designer is an electrical engineering application, such as electrical designer application 207. Different or fewer engineering applications, engineering disciplines and engineering roles may be provided. A different engineering application is referred to as Engineering Application XY, corresponding to any other engineering discipline XY. Various engineers, designers, technicians, managers and other users access the engineering applications, such as line design engineers, automation engineers, MCD engineers and XY engineers. Workstations 305 with engineering applications 307 form a multidisciplinary engineering system, such as multidisciplinary engineering system 100.

Engineering applications 307 instantiate a multidisciplinary template stored in the template library on the server 301. When a template is instantiated, objects and parameters are copied from the template library to the engineering applications 307 according to the configuration of the multidisciplinary template. For example, when the NX Automation Designer application instantiates a multidisciplinary template, objects and parameters are transmitted to the engineering applications 307 and are stored as object instances.

Engineering Environment 300 includes server 301. Server 301 includes a Teamcenter application 309 with a multidisciplinary template management module 311, and databases 313. Additional, different, or fewer components may be provided. For example, Teamcenter application 309 may be uploaded to, and executed by, a processor in server 301. Likewise, processing strategies may include multiprocessing, multitasking, parallel processing and the like. The server 301 is implemented on a computer platform having hardware such as one or more central processing units (CPU), a random access memory (RAM), and input/output (I/O) interface(s). The computer platform also includes an operating system and microinstruction code. The various processes and functions described herein may be either part of the microinstruction code or part of the program (or combination thereof) which is executed via the operating system. Alternatively, the server 301 includes one or more processors in a network.

The Teamcenter application 309 serves as dedicated multidisciplinary template environment. Teamcenter application 309 includes a multidisciplinary template management module 311 allowing a user to add, delete or modify multidisciplinary templates for use in engineering applications 307. Engineering objects and parameters are added and/or removed for each engineering application 307 to generate a multidisciplinary template. Each object and parameter are linked to the multidisciplinary template. The Teamcenter application 309 stores the multidisciplinary templates in template library on databases 313. The databases are referenced by the multidisciplinary template management module 311.

The Teamcenter application 309 also serves as a metamodel based repository system and data platform for the engineering applications 307 by storing data received from the engineering applications 307 in the databases 313. The data received from the engineering applications 307 includes project specific data, such as object and parameter names, parameter values, device specifications, and/or other information. The Teamcenter application 309 operates as a multidisciplinary system server 311 that communicates information to/from the engineering applications 307 over network 303.

Network 203 is a wired or wireless network, or a combination thereof. Network 203 is configured as a local area network (LAN), wide area network (WAN), intranet, internet or other now known or later developed network configurations. Any network or combination of networks for communicating between the role-specific applications and the server for hosting the templates, data, or other information of the engineering system may be used.

Figure 4:
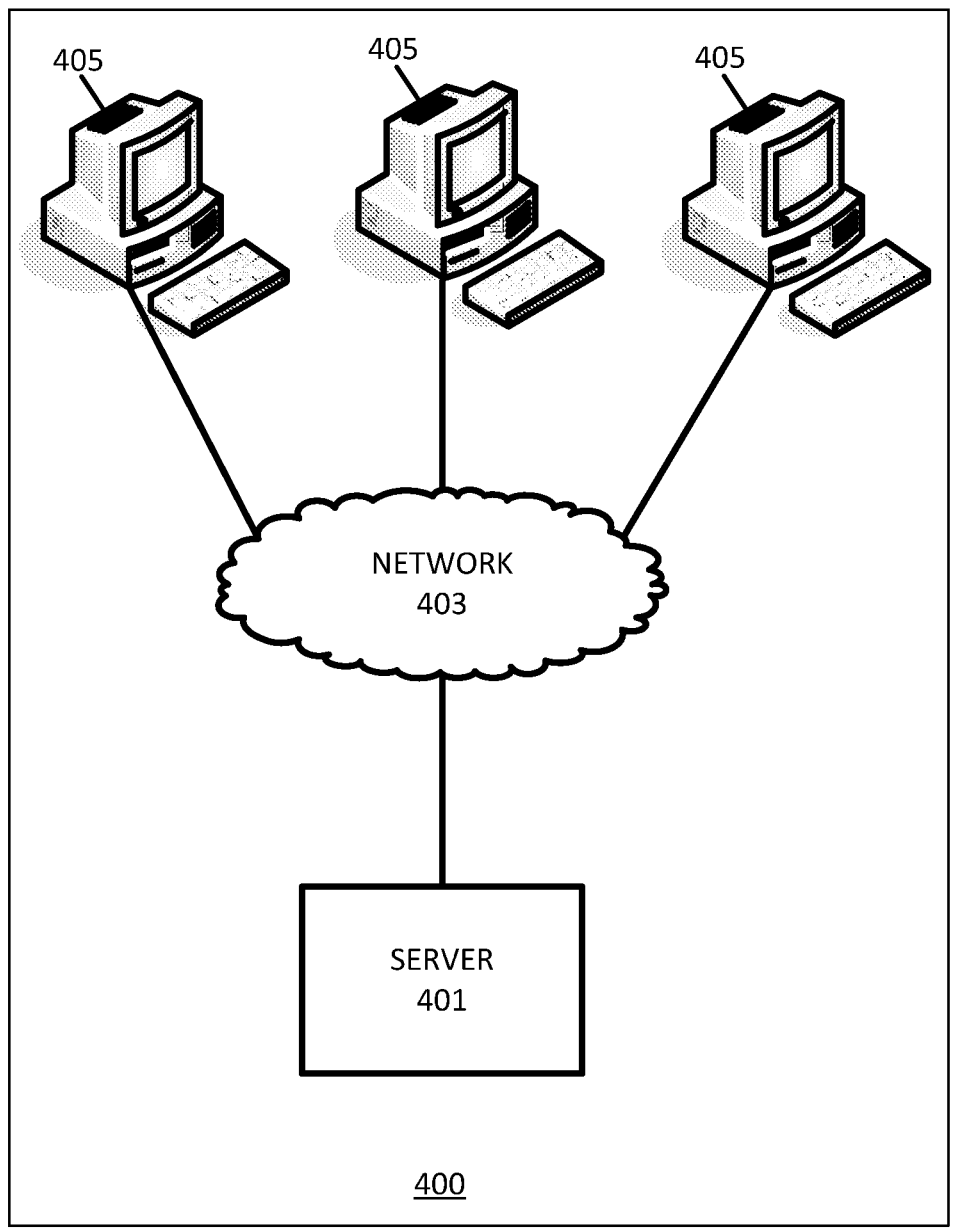
FIG. 4 illustrates one embodiment of a computer program product for linking data in a multidisciplinary template in a multidisciplinary engineering system.

FIG. 4 illustrates an embodiment of a multidisciplinary system implementing the environment 300 of FIG. 3 or another environment. The multidisciplinary system 400 includes server 401, network 403 and workstations 405. Additional, different, or fewer components may be provided. For example, more or fewer workstations 405 are used. As another example, additional networks and/or servers are used. In yet another example, a separate database managed or accessed by the server 401 or the workstations 405 is provided.

Server 401 is a server computer platform having hardware such as one or more central processing units (CPU), a system memory, a random access memory (RAM) and input/output (I/O) interface(s). The server 401 is implemented on one or more server computers connected to network 403. Additional, different or fewer components may be provided.

Server 401 is configured to execute a template generation application. The template generation application is a dedicated template generation application, such as the Teamcenter application 301. Alternatively, the template generation application is managed or hosted in a distributed environment, such as different engineering applications making up a template generation environment. The server 401 is configured to contribute some aspect of the Teamcenter application 301. In yet another alternative, the server 401 is implemented by a workstation 405 so that a given engineering application hosts the server functions. The template generation application is configured to generate a multidisciplinary template representing an engineered device or other object.

The server 401 executes the template generation application to design or use a template for a given engineered device or other object. The engineered device or other object is represented in the multidisciplinary system, such as the engineering device being a conveyor on a factory assembly line.

The multidisciplinary template includes objects associated with the engineered device. Each object is associated with at least one engineering application, such as engineering applications 307. For example, for a conveyor on a factory assembly line, a line designer application 201 includes a single object for the conveyor, an automation designer application 203 includes three objects for the conveyor, Sensor1, Sensor2 and Motor1, an MCD application 205 includes four objects for the conveyor, Face1, Face2, Curve1 and Curve2, and electrical designer application 207 includes six objects, AC power output, Motor1 input, Sensor1 input, Sensor1 output, Sensor2 input and Sensor2 output. Objects are grouped in a template for each engineering application, and objects and corresponding data are linked to server 301. Alternatively, objects and corresponding data are linked directly between engineering applications. The collection of objects in the multidisciplinary template are stored in the server 301 and the engineering applications allowing the objects and corresponding data to be identifiable across the engineering applications.

The multidisciplinary template also includes an engineering discipline specific parameter associated with each of the engineering objects. Each parameter is associated with at least one engineering application, such as engineering applications 307 running on workstations 405. For example, the conveyor object in the line designer application 201 includes two parameters, length and speed. The engineering discipline specific parameters are configurable in the associated engineering applications. The engineering discipline specific parameters include default values for the object. Alternatively, the engineering discipline specific parameters are valueless initially and are to be configured with values after instantiation.

The server 401 is also configured to update the multidisciplinary template. Multidisciplinary template updates include the following: adding or removing objects and/or parameters to the template; modifying existing objects and/or parameters in the template; and/or deleting the multidisciplinary template entirely. In response to updating the template, server 401 propagates the update to one or more workstations 305 over network 403. For example, in a multidisciplinary template for a conveyor, adding a third sensor will require an additional object for the automation design application (i.e. sensor3) and two additional objects for the electrical design application (i.e. sensor3 input and sensor3 output). In this example, the update will be propagated to the workstations 405 running the automation design and the electrical design applications only. The propagation operations may commence in response to an input by a user. Alternatively, the template generation application is configured to propagate the updates automatically or in response to a condition being met in or decision being made by the template generation application or an engineering application.

The workstations 405 are configured to run at least one engineering application, such as engineering applications 307. The engineering applications are accessed by various engineers, designers, technicians, managers and other users to instantiate the multidisciplinary templates. Each workstation 405 can be configured to run all engineering applications, or configured to execute one engineering application per workstation 405. Alternatively, the workstations 405 may be configured to execute engineering applications stored on server 401. Each engineer, designer, technician, manager and other user is provided with login credentials, such as a username and password, to access the engineering applications. Each user can access the engineering application and related information based on her role on the project, and access can be set according to permissions associated with each set of login credentials.

The workstations 405 are in communication with server 401 over network 403. Workstations 405 are configured to execute engineering applications instantiating multidisciplinary templates configured on server 401. For example, the engineering applications include engineering applications 205. In response to a workstation 305 instantiating a multidisciplinary template, one or more objects configured in the multidisciplinary template are copied from server 401 to the engineering applications executing on the workstations 405. Only objects associated with a specific engineering application and engineering discipline are copied to that engineering application. The object(s) include references to the multidisciplinary template on server 401. One or more parameters associated with the object(s) are also copied from server 401 to the engineering application executing on the first workstation 305.

The workstations 405 are further configured to execute engineering applications to configure the object(s) and/or parameter(s) with engineering discipline specific data for the instance. For example, for a conveyor on a factory assembly line, the multidisciplinary template includes a conveyor object in the line designer application 201 with two parameters, length and speed. The engineering application can configure data for the conveyor object, such providing the object with a unique name and/or number. The engineering application may also configure the parameters associated with the conveyor object, by specifying the length of the conveyor being installed and the conveyor speed. Upon configuring object(s) and/or parameter(s) on a workstation 405, the workstation 405 is configured to upload the configured data to the server 401. For example, the unique name and/or number of the conveyor object and the specified length and speed are uploaded to the server 401. The upload operations may commence in response to an input by a user, allowing the user to upload a single data entry, or be uploaded in batches of data entries. Alternatively, the engineering applications are configured to upload data automatically, such as using push operations.

Figure 5:
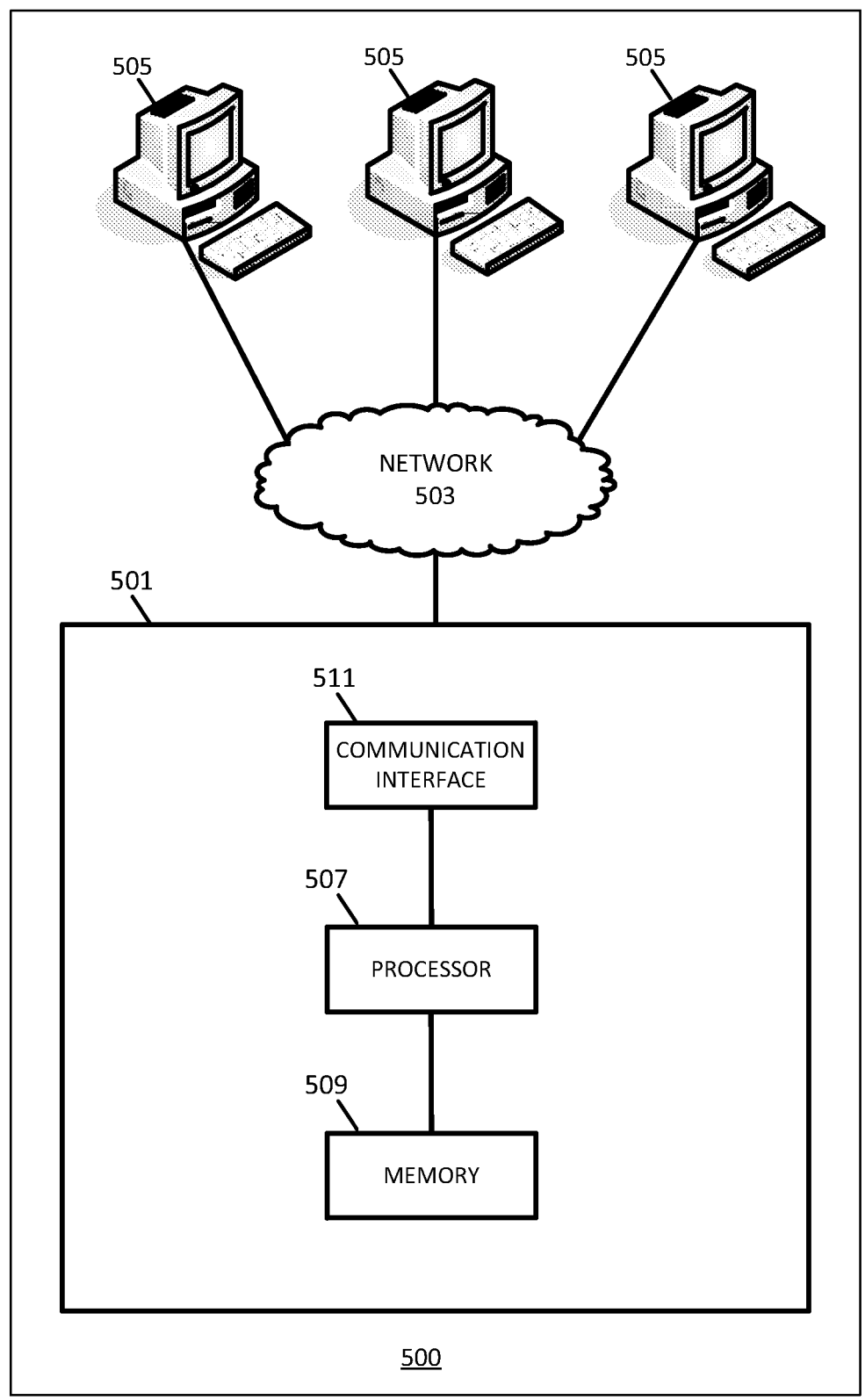
FIG. 5 illustrates an embodiment of the multidisciplinary system for linking data in a multidisciplinary template

FIG. 5 illustrates an embodiment of the multidisciplinary system for linking data in a multidisciplinary template. In particular, FIG. 5 illustrates an example embodiment of the server 401 of FIG. 4. The multidisciplinary system 500 includes a the server 501, network 503 and computers 505. Additional, different or fewer components may be provided. The computers 505 are workstations or other computing devices as described for FIG. 4. The network 503 is a network as described for FIG. 4.

The server 501 is implemented on a server computer platform, such as server 401. Server 501 includes a processor 507, a memory 509 and a communication interface 511. Alternatively, server 501 is implemented on a personal computer, a processor with memory, or other now known or later developed computing and/or processing systems with additional, different or fewer components.

Server 501 includes a non-transitory computer readable storage medium, such as memory 509. The memory 509 stores computer readable program code that is executed by processor 507, such as code for the Teamcenter application 201. The computer readable program code is executable by the processor 507 to configure a multidisciplinary template representing a device or other object. The multidisciplinary template is configured to include engineering objects associated with the device. The objects are also associated with at least one engineering applications executable on computers 505. Each engineering application executable on computers 505 is configured for engineering discipline specific roles related to the device. The multidisciplinary template is configured to include at least one engineering parameter for each of the objects. The engineering parameters are different based on the engineering discipline specific role.

Server 501 is configured to receive a request to instantiate the multidisciplinary template from a computer 505 over network 503. Upon receiving the request to instantiate the multidisciplinary template, server 501 is configured to transmit the engineering objects and parameters from the multidisciplinary template to the engineering applications running on computers 505. Each computer 505 receives the engineering objects and parameters associated with the engineering applications running on the computer 505. Alternatively, the objects and parameters are transmitted only to the requesting engineering application.

Figure 6:
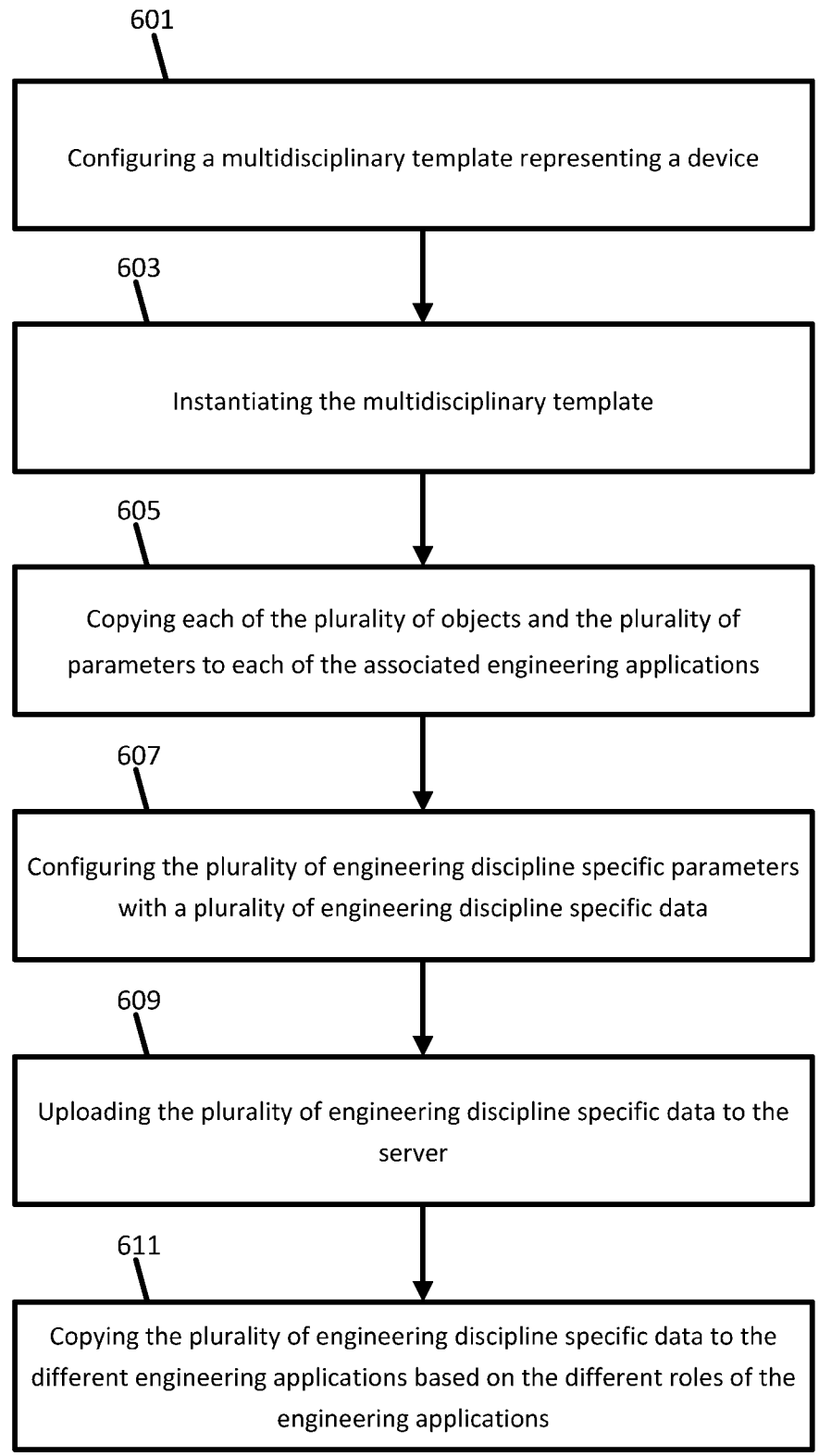
FIG. 6 is a flowchart diagram of one embodiment of a method for linking data in a multidisciplinary system.

FIG. 6 is a flowchart diagram of one embodiment of a method for linking data in a multidisciplinary system. The method is implemented by the system of FIG. 3, 4, 5 and/or a different system. A processor or group of networked processors perform the acts, such as pursuant to instructions, programming or circuit design. Additional, different or fewer acts may be provided. The method is provided in the order shown. Other orders may be provided and steps may be repeated.

In act 601, a multidisciplinary template is configured to represent an engineered device or other object. The template is configured in a dedicated template environment as a standalone application running on a server in a multidisciplinary engineering system. Alternatively, the dedicated template environment may be part of one or more engineering applications in a multidisciplinary engineering system. Engineering objects are selected and added to the multidisciplinary template for each engineering application and discipline. Engineering parameters are also selected and added for each engineering object. The multidisciplinary template is named and saved to a template library. The multidisciplinary template is stored on a server in the template library with other templates for other devices.

All of the engineering objects represent a characteristic or other information associated with the device, and different objects are associated with different engineering applications and disciplines having different roles with respect to the device. The engineering objects represent different engineered characteristics of the device relevant to the different engineering disciplines. For example, for a conveyor on a factory assembly line, a line designer application 201 includes a single object for the conveyor, an automation designer application 203 includes three objects for the conveyor, Sensor1, Sensor2 and Motor1, an MCD application 205 includes four objects for the conveyor, Face1, Face2, Curve1 and Curve2, and electrical designer application 207 includes six objects, AC power output, Motor1 input, Sensor1 input, Sensor1 output, Sensor2 input and Sensor2 output. Objects are grouped in a template for each engineering application, and objects and corresponding data are linked to server 301. Alternatively, objects and corresponding data are linked directly between engineering applications. The collection of objects in the multidisciplinary template are stored in the server and/or in the associated engineering applications so that the objects and corresponding data are identifiable across the engineering applications. The multidisciplinary template allows the user to specify which objects, parameters and data are available to each engineering application and discipline. Any objects or parameters used for more than one application and discipline are handled in a unified manner using the multidisciplinary template.

Each parameter is associated with at least one engineering application, such as engineering applications 307 running on workstations 405. There may be one or more engineering discipline specific parameters for each of the objects. At least some of the parameters for the different objects are different based on the different roles, tasks and/or responsibilities of the engineering disciplines with respect to the device. For example, the conveyor object in the line designer application 201 includes two parameters, length and speed. The engineering specific parameters are configurable by the plurality of engineering applications based on the roles of the engineering applications related to the device. The engineering discipline specific parameters include default values for the object. Alternatively, the engineering discipline specific parameters must be configured with values after instantiation.

In one embodiment, objects are selected and added directly to the multidisciplinary template. In another embodiment, objects are grouped as an application template for each discipline, with each application template linked together and saved as a multidisciplinary template. In this embodiment, engineering objects are stored and available for selection in engineering application libraries. Alternatively, the user may create a new object for an application template and may add the object to the engineering application library for later reuse. Once an engineering application template is created, objects are selected and added to the engineering application template. The engineering application templates, and the associated objects and parameters, are linked to the multidisciplinary template. Linking all objects to the multidisciplinary template allows corresponding objects, parameters and data to be identifiable across all disciplines.

Figure 7:
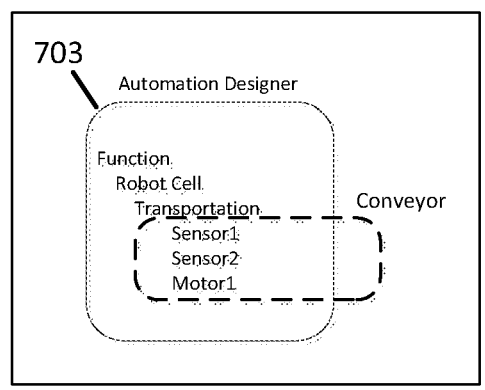
FIG. 7 illustrates one embodiment of engineering objects grouped as a single engineering entity in an engineering application.
Figure 8:
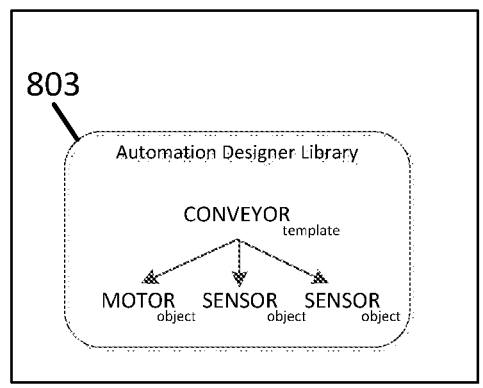
FIG. 8 illustrates an example of a template referencing objects in an engineering application library.

FIG. 7 illustrates one embodiment of engineering objects grouped as a single engineering entity in an engineering application. As illustrated, three objects are provided for a conveyor in the automation designer application 703 (i.e., sensor1, sensor2 and motor1). FIG. 8 illustrates an example of an application template that references objects in an engineering application library. For example, configuring a conveyor template for an automation designer application 803 involves selecting three objects in the engineering application library (i.e., a motor object, a sensor object and a sensor object). The template for the automation designer application 803 is linked to the multidisciplinary template for the conveyor, allowing corresponding objects, parameters and data to be identifiable across all disciplines.

Figure 9:
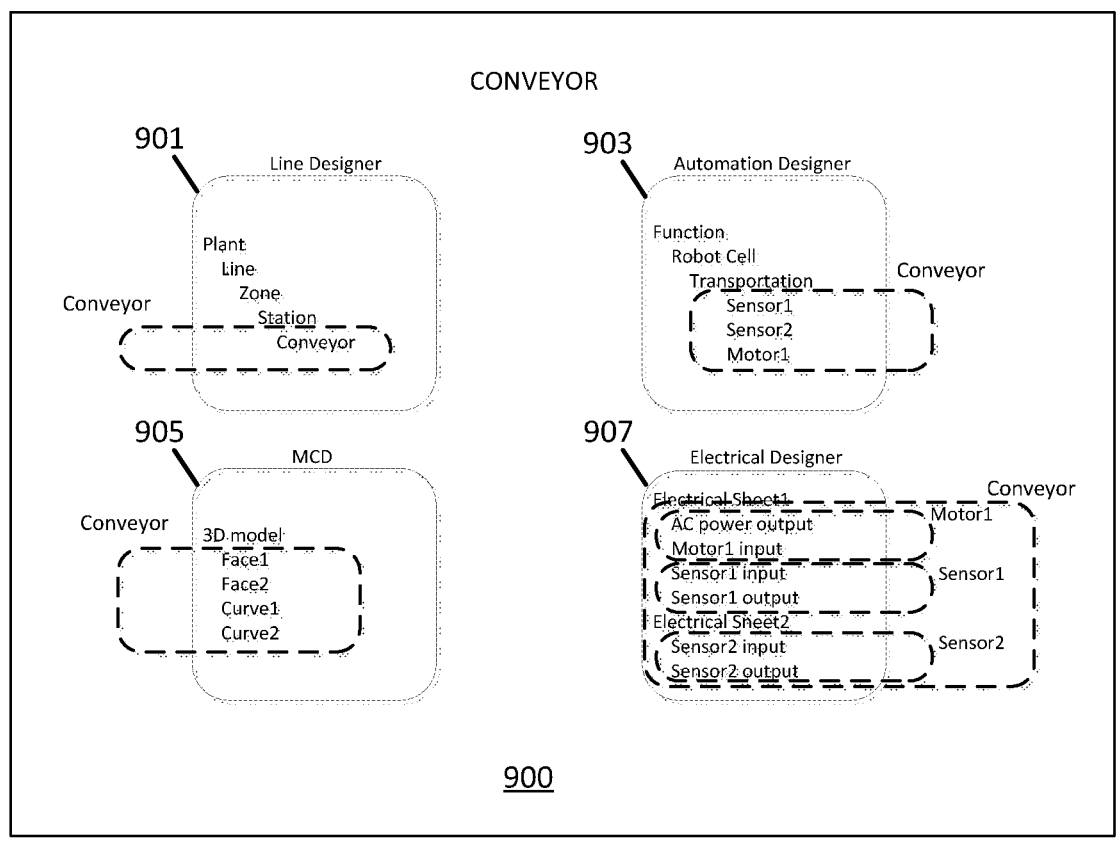
FIG. 9 illustrates an example of different engineering objects of the same conveyor throughout different engineering disciplines of a multidisciplinary engineering system.

FIG. 9 illustrates an example of the different engineering objects for the same conveyor throughout different engineering disciplines of a multidisciplinary engineering system. As shown in FIG. 9, the multidisciplinary template named Conveyor in the multidisciplinary engineering system 900 includes objects for the line designer application 901, the automation designer application 903, the MCD application 905 and the electrical designer application 907. The objects in the multidisciplinary template may be hierarchically organized in multiple views, corresponding to the different objects and parameters. For example, the multidisciplinary template may organize engineering data according to the IEC81346 standard, which describes the organization of engineering data in multiple structures and deriving designations from the structures. Other standards and data structures may be provided.

Figure 10:
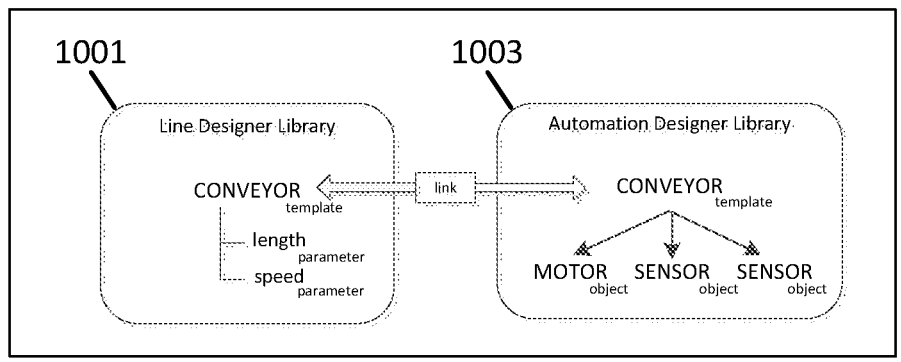
FIG. 10 illustrates an example of a cross-discipline link between engineering application libraries established by a multidisciplinary template.

The multidisciplinary template also includes a cross-discipline link between the engineering objects, engineering discipline specific parameters and related data for the same device to the multidisciplinary template representing the device. Alternatively, objects and corresponding data are linked directly between engineering applications. The cross-discipline link allows the device to be represented differently in each application. For example, FIG. 10 illustrates an example of a cross-discipline link between engineering application libraries established by a multidisciplinary template. As shown in FIG. 10, the conveyor template for the line designer application is linked to the conveyor template for the automation designer library. The engineering objects, engineering discipline specific parameters, and related data are linked to the multidisciplinary template metadata information stored with the engineering objects, engineering discipline specific parameters, related data, and the multidisciplinary template. Alternatively, copying generates additional reference data in the plurality of objects referencing the multidisciplinary template stored in the template library.

Figure 11:
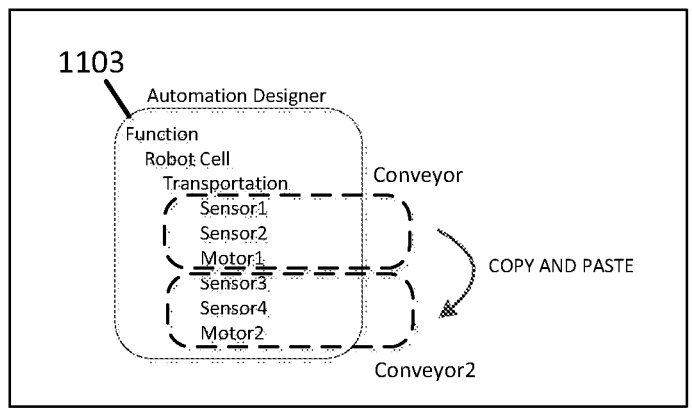
FIG. 11 illustrates an example of copy and paste operations of a template instance.

In act 603, the multidisciplinary template is instantiated. The multidisciplinary template is used by instantiating it from the template library in one or more of the engineering applications running on one or more workstations. The template has a default identifier that may be configured in the engineering application by the user. Alternatively, the template is instantiated by copy-pasting a previously instantiated template in an engineering application. Copy-pasting a previously instantiated template instantiates a new template of the same type from the library, but with a unique identifier that is derived from the copied instance's identifier. Engineering data from the template instance may have been configured and/or connected to external data, and copy-pasting the template instance retains the external connections from the copied template instance. For example, if the previous instance was assigned automation domain specific objects, such as a block of code for a specific PLC hardware, the new instance will have the same assignment. FIG. 11 illustrates another example of copy and paste operations of a template instance. The conveyor instance, named Conveyor with objects sensor1, sensor2 and sensor3, is copy-pasted in the automation designer application 1103. The new instance is named Conveyor2 has objects sensor3, sensor4 and motor2.

Figure 12:
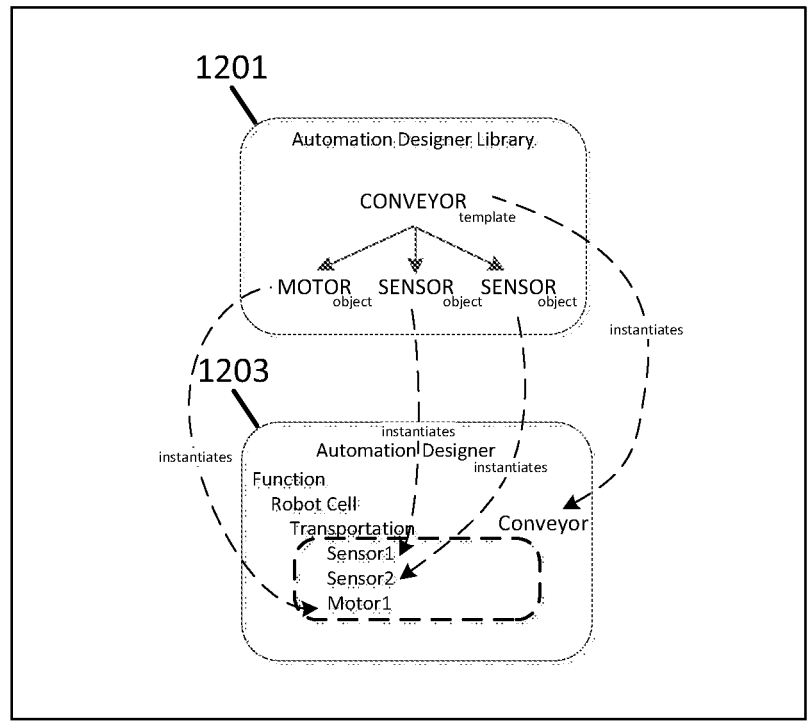
FIG. 12 illustrates an example of a multidisciplinary template instantiation and copying from the engineering application libraries.

In act 605, each of the objects and parameters is copied to one, more, or each of the associated engineering applications. The objects and corresponding parameters are communicated to the engineering applications running on workstations. Each copied object and parameter retains a reference link to the template library. FIG. 12 illustrates a multidisciplinary template instantiation and copying from the engineering application libraries. In response to instantiating the multidisciplinary template, the conveyor template is copied from the automation designer library 1201 to the automation designer application 1203. Each of the objects and associated parameters are copied to the automation designer library 1203. For example, the motor object is copied as motor1, a sensor object is copied as sensor1 and another sensor object is copied as sensor2. The objects and parameters appropriate for the given application are copied, but additional objects and parameters may be copied even though not used by the given application.

Alternatively, the objects and parameters copied during instantiation is configurable by the user during instantiation. For example, the multidisciplinary engineering template provides options, variants and/or choices during instantiation. The options, variants and choices can span across engineering disciplines, or may be engineering discipline specific. In an embodiment, the user is presented with various options while instantiating a multidisciplinary engineering template. For example, a conveyor template has two possible variants for the electrical designer application, such as a single proximity sensor or two laser barriers. In another example, a conveyor template has options based on the length of the conveyor, such that the conveyor instance has a single motor if the length of the conveyor is less than 10 meters, or two motors and a different control program if the length of the conveyor is greater than 10 meters.

When a template is instantiated in an engineering application, the corresponding linked library templates of the other disciplines are also instantiated. Referring to FIG. 9, for example, instantiating the conveyor template in the automation designer application 903 will also copy the respective objects and parameters to the line designer application 901, the MCD application 905 and the electrical designer application 907. In another example, a line designer and/or engineer adds a conveyor to the factory plan in the line designer application 901. In response to adding the conveyor, the multidisciplinary system knows, through the link to the template library, that a conveyor template is also needed in the automation designer application 903, and will add the motor object and sensor objects to the automation designer application 903. An automation engineer can determine from the template instance that the two sensors and the motor belong to a conveyor template. In alternative embodiments, the existence of the added multidisciplinary template is stored, and the respective linked library templates are instantiated as corresponding applications are used or started.

In act 607, the engineering specific parameters are configured with engineering specific data and other information. The different engineering applications running on the workstations may contribute data with respect to the needs of each respective engineering discipline. Each engineering application may rename and/or renumber the copied engineering objects and engineering discipline specific parameters, and the engineering discipline specific parameters are configured with engineering discipline specific data related to the device. For example, the line designer application configures the conveyor length and speed parameters associated with the conveyor object by specifying the length of the conveyor being installed and the conveyor speed.

In act 609, the engineering discipline specific data is uploaded to the server. In response to configuring the engineering objects and engineering specific parameters with engineering discipline specific data, the configured data is uploaded to the server. For example, the unique name and/or number of the conveyor object and the specified length and speed are uploaded to the server. The upload operations may commence in response to an input by a user, allowing the user to upload a single data entry, or be uploaded in batches of data entries. Alternatively, the engineering applications are configured to upload the data automatically, such as using push or pull operations.

In act 611, the engineering specific data is copied to the engineering application based on the roles of the engineering applications. In response to uploading the plurality of engineering discipline specific data, the plurality of engineering discipline specific data is copied to the different engineering applications based on the different roles of the engineering applications. The engineering applications display the copied engineering objects, engineering discipline specific parameters and engineering discipline specific data to represent the device. The engineering objects and engineering discipline specific parameters are displayed according to the hierarchy configured in the multidisciplinary template. Alternatively, more than one hierarchy may be configured in the multidisciplinary engineering template. For example, one or more hierarchies can be configured for each engineering discipline.

Figure 13:
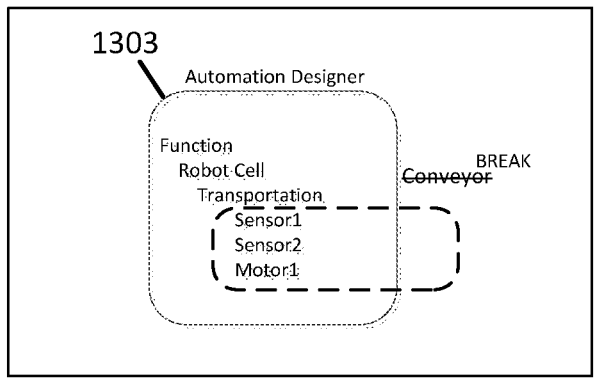
FIG. 13 illustrates an example disassociating a template instance from a template.

Additional or different acts may be provided to the method illustrated in FIG. 6. For example, FIG. 13 illustrates an example disassociating, or breaking, a template instance from a template. The hierarchical organization of the objects in a template is fixed and cannot be compromised. Therefore, if objects need to be moved from their original structure, the template instance will be disassociated or broken. When the instance is disassociated, the engineering objects and engineering discipline specific parameters become independent of the multidisciplinary template and the link to the multidisciplinary template is deleted. The engineering applications have a "break template" process that severs the link between the engineering objects and the multidisciplinary template. Other engineering applications with objects previously linked to multidisciplinary template with the disassociated objects are notified that the objects are no longer linked to the multidisciplinary template and are given the option to delete the objects, or the maintain them independent of the multidisciplinary template. The disassociated engineering objects and engineering discipline specific parameters are not updated or modified when changes are made to the multidisciplinary template.

Figure 14:
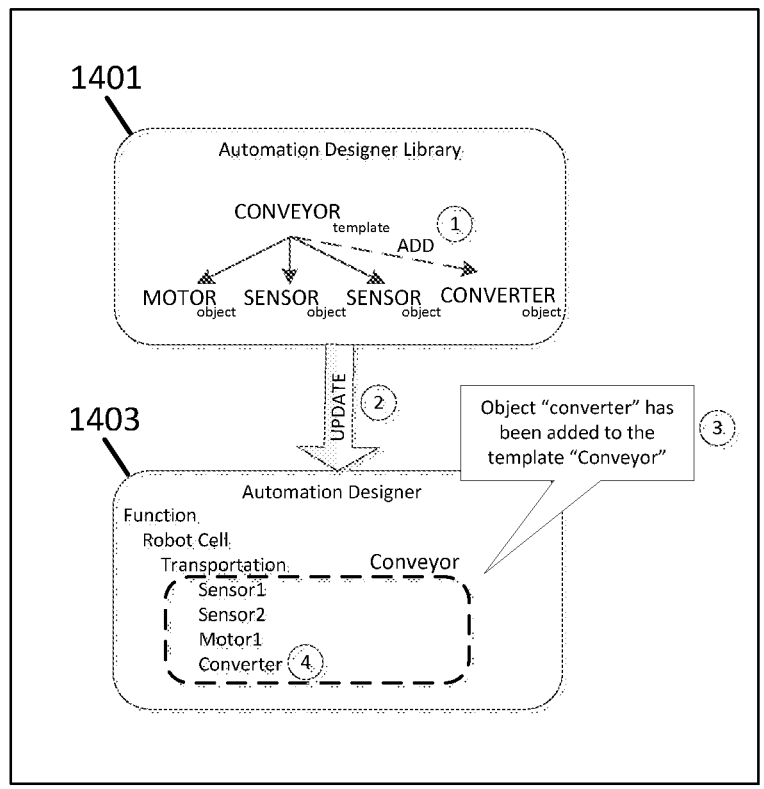
FIG. 14 illustrates an example of a template instance update as a result of a template update.

Additionally, for example, existing multidisciplinary templates may be edited in the template environment, such as by adding or removing objects, or adding or removing objects parameters. Each template instance is linked to a multidisciplinary template in the template library. If the original library template is edited, the engineering applications with the template instances are notified and the engineering applications display a message informing of the update. If engineering objects and/or engineering discipline specific parameters are added, or if the structure in the template is changed, the template instance is changed accordingly in the engineering applications affected by the change. If an object is removed from the library template, the engineering application gives the user a choice of keeping the instance object as an independent object, or delete the object. Alternatively, the object is automatically deleted. FIG. 14 illustrates an example of a template instance update that is propagated as a result of an update to the multidisciplinary template. For example, a converter object is added to the conveyor template in the automation designer library 1401 (i.e., act 1). The update is communicated to the automation designer application 1403 (i.e., act 2). In response to the update, the automation designer application 1403 displays the message "Object 'converter' has been added to the template 'Conveyor'" (i.e., act 3). The converter object is then copied to the automation designer application 1403 (i.e., act 4).

Figure 15:
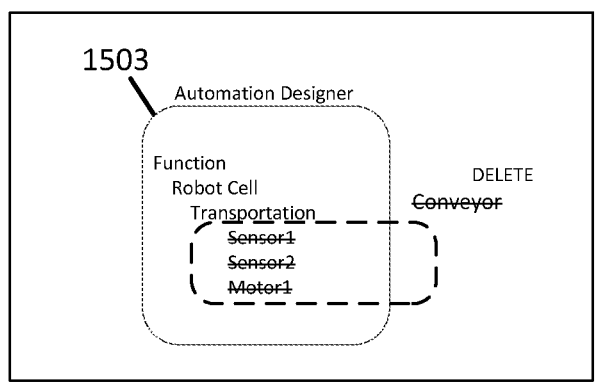
FIG. 15 illustrates an example of deleting a template instance.

FIG. 15 illustrates an example of deleting a template instance. Upon deletion of the template instance, the deletion is propagated to other engineering applications and all objects referenced are deleted from the multidisciplinary engineering system. Propagating the deletion to other engineering applications allows the engineering data from the template to be removed completely and assures a coherent state across disciplines in the engineering process. The propagation operations may commence in response to an input by a user. Alternatively, the template generation application is configured to propagate the updates automatically or in response to a condition being met in or decision being made by the template generation application or an engineering application.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for linking data in a multidisciplinary engineering system, the method comprising:
   configuring, with a server, a multidisciplinary template representing a device, wherein the multidisciplinary template comprises:
      a plurality of objects associated with the device, wherein different ones of the objects are associated with different engineering applications for different engineering disciplines with different roles related to the device, wherein the plurality of objects represent different engineered characteristics of the device relevant to the different engineering disciplines; and
      a plurality of engineering discipline specific parameters for each of the objects, at least some of the parameters for the different objects being different based on the different engineering disciplines;
   instantiating the multidisciplinary template in the plurality of engineering applications on different computers, the object and corresponding parameters communicated to the engineering applications operating on the respective computers;

copying, in response to instantiating the multidisciplinary template, each of the plurality of objects and the plurality of parameters to each of the associated engineering applications.

2. The method of claim 1 wherein the multidisciplinary template is stored on the server in a template library with other templates for other devices.

3. The method of claim 1 wherein the plurality of parameters are configurable by the plurality of engineering applications based on the roles of the engineering applications related to the device.

4. The method of claim 3 further comprising:
configuring, in the plurality of engineering applications on different computers, the plurality of engineering discipline specific parameters with a plurality of engineering discipline specific data related to the device.

5. The method of claim 4 further comprising:
uploading, in response to configuring the plurality of engineering specific parameters, the plurality of engineering discipline specific data to the server.

6. The method of claim 5 further comprising:
copying, in response to uploading the plurality of engineering discipline specific data, the plurality of engineering discipline specific data to the different engineering applications based on the different roles of the engineering applications.

7. The method of claim 1 further comprising:
displaying, in the plurality of engineering applications on different computers, a representation of the device based on the objects and the parameters associated with the different engineering applications.

8. The method of claim 7 wherein the objects and the parameters are displayed according to a hierarchy configured in the multidisciplinary template.

9. The method of claim 2 wherein copying comprises generating reference data in the plurality of objects to the multidisciplinary template stored in the template library.

10. The method of claim 9 further comprising:
propagating changes to the multidisciplinary template to the linked plurality of objects and the linked plurality of parameters.

11. The method of claim 9 further comprising:
disassociating the linked plurality of objects and the linked plurality of parameters from the multidisciplinary template.

12. A multidisciplinary engineering system comprising:
a server, wherein the server is configured to execute a template generation application to generate a multidisciplinary template representing an engineered device, wherein the generated template comprises:
a plurality of objects associated with the engineered device, wherein each of the plurality of objects is associated with one of a plurality of engineering disciplines, wherein the plurality of objects represent different engineered characteristics of the device relevant to the different engineering disciplines; and
an engineering discipline specific parameter associated with each of the objects, at least some of the parameters for the different objects being different based on the different engineering disciplines;
a first workstation in communication with the server over a network, wherein the first workstation is configured to execute a first engineering application instantiating the multidisciplinary template, wherein instantiating the multidisciplinary template:
copies a first object from the multidisciplinary template, wherein the first object associated with a first engineering discipline; and
copies a first parameter from the from the multidisciplinary template, wherein the first parameter associated with the first object;
a second workstation in communication with the server over the network, wherein the second workstation is configured to execute a second engineering application, wherein in response to the first workstation instantiating the multidisciplinary template, the second engineering application:
copies a second object from the multidisciplinary template, wherein the second object associated a second engineering discipline; and
copies a second parameter from the multidisciplinary template, wherein the second parameter associated with the second object.

13. The system of claim 12 wherein the first engineering application configures the first parameter with a first of engineering specific data related to the first discipline and the second engineering application configures the second parameter with a second engineering specific data related to the second discipline.

14. The system of claim 13 wherein, in response to configuring, the first and second engineering applications are configured to upload the first engineering specific data and the second engineering specific data to the server.

15. The system of claim 13 wherein the first and second engineering applications are configured to upload automatically.

16. The system of claim 12 wherein the first object and second object include references to the multidisciplinary template stored on the server.

17. The system of claim 16 wherein the server is further configured to execute the template generation application to update the multidisciplinary template.

18. The system of claim 17 wherein, in response to updating the multidisciplinary template, the server is configured to propagate the update to the first engineering application and the second engineering application.

19. A computer program product for linking data in a multidisciplinary template in a multidisciplinary engineering system, the computer program product comprising:
a non-transitory computer readable storage medium having computer readable program code embodied therewith, the computer readable program code configured to:
configure a multidisciplinary template representing a device, wherein the multidisciplinary template comprises:
a plurality of objects associated with the device, wherein each of the plurality of objects is associated with one of a plurality of different engineering applications for different engineering disciplines with different roles related to the device, wherein the plurality of objects represent different engineered characteristics of the device relevant to the different engineering disciplines;
a plurality of parameters for each of the objects, at least some of the parameters for the different objects being different based on the different engineering disciplines;

receive, over a network, a request to instantiate the multidisciplinary template from a computer running one of the plurality of different engineering applications; and transmit, over the network, in response to the request, each of the plurality of objects and each of the plurality of parameters to the associated engineering application.

* * * * *